Sept. 5, 1933.　　　J. H. DE BOER ET AL　　　1,925,307
ELECTRIC CONDENSER
Filed March 16, 1931
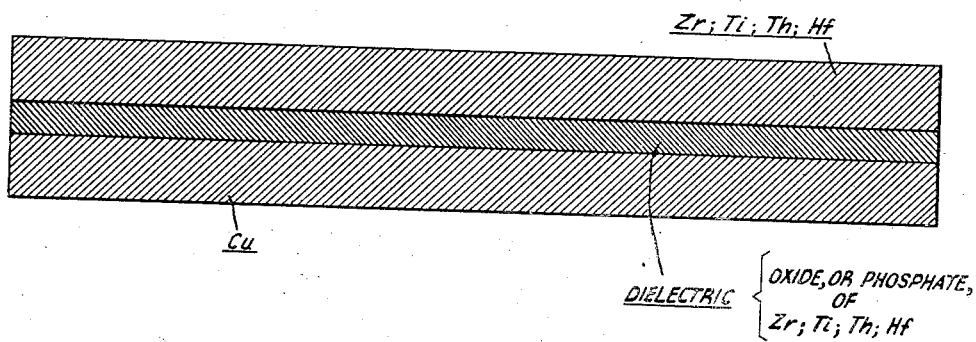
INVENTOR
JAN H. de BOER
WILLEM C. VAN GEEL
BY
ATTORNEY Patented Sept. 5, 1933

1,925,307

UNITED STATES PATENT OFFICE 1,925,307

ELECTRIC CONDENSER

Jan Hendrik de Boer and Willem Christiaan Van Geel, Eindhoven, Netherlands, assignors to Radio Corporation of America, a corporation of Delaware Application March 16, 1931. Serial No. 523,181, and in the Netherlands March 21, 1930

5 Claims. (Cl. 175—315)

This invention relates to condensers, for example, stack-wound or variable condensers.

In the condenser, according to the invention, at least one of the electrodes consists of one of the metals of the first sub-group of the fourth principal group of the periodic system of the elements, the di-electric consisting entirely, or partly, of a layer of a stable chemical compound obtained by converting the electrode material at the surface of the electrodes.

By such a chemical compound a compound is denoted which is produced on the electrodes by treating them either chemically, or electrolytically, or in another manner. It goes without saying that only those compounds are produced that are not electrically conductive, and according to the invention those compounds are selected which are most stable; for example, those which can be converted into other compounds only by means of strong chemical reagents.

It has already been proposed to manufacture condensers having electrodes made of definite metals, for example, aluminum or tantalum, and having a dielectric consisting of compounds, for example, oxides, of the metals which are obtained in the manner above referred to. It has been proven, however, that these compounds are chemically less stable than the compounds of the metals of the first sub-group of the fourth principal group which are suitable for this purpose.

The dielectric properties of the first mentioned compounds are subject to modification, for example, due to chemical action, so that it is impossible to keep the capacity of such condenser constant in all circumstances. On the contrary, the compounds used as dielectric in a condenser according to the present invention, are stable so that the dielectric properties are not subject to modification.

Moreover, these compounds have the advantage over the compounds of tantalum and aluminum for example, that they adhere much more firmly to the material from which they are obtained. Consequently, the assembly thus formed may be considered as it were one mechanical aggregate so that any risk of damage is practically avoided. This property may be taken advantage of, for example, when manufacturing variable condensers according to the invention. In the accompanying drawing is shown a condenser constructed according to the invention.

As compounds which are suitable for this purpose, the phosphates, for example, may be mentioned. It has been found, however, that the oxides of the metals entering into consideration have the most stable properties in chemical and mechanical respect, so that they are eminently adapted, for use as dielectric in condensers according to the invention. Good results have been obtained, for example, if at least one of the electrodes is made of zirconium, and zirconium oxide is used as dielectric material. As the second electrode, any other material which is suitable, therefore, in electrical respect may be used; for example, copper, which has good electrically conducting properties.

As stated hereinbefore the metal compounds according to the invention are obtained electrolytically, chemically or in another manner from the material constituting the electrodes themselves. To this effect a plate consisting, for example, of zirconium may be heated in an oxygen atmosphere to a temperature of 700 to 800° C., thus producing a layer of zirconium oxide which has the property of adhering very firmly to the zirconium plate. The layer may of course also be formed by immersing the metal in chemicals. The same method may be used for forming a layer on titanium, thorium or hafnium.

For electrolytically producing a surface layer, zirconium, for example may be oxidized by means of the electrolytes phosphoric acid, sulfuric acid, lye or ammonium borate. For one of the electrodes which are placed in the bath a plate consisting of zirconium is used, while the other electrode may be shaped as a rod consisting for example, of platinum, carbon or other material which is not attacked by the said electrolytes. The thickness of the layer may be deduced from the color shown by the plate during the oxidation. When choosing, for example, a plate of 2 square cm., consisting of zirconium as one of the electrodes, which is electrolytically oxidized in phosphoric acid until a layer having a thickness of approximately $10^{-4}$ to $10^{-3}$ cm., is produced, then a condenser having a capacity of 1000 to 1200 cm., is obtained, which is adapted for low voltages. The metals titanium and hafnium may be treated in the same way. For thorium, however, this method proves to be less suitable, so that in this case preferably chemical means are resorted to.

In dependency of the thickness of the layer of dielectric the condenser may be used for a wide voltage range. According to the condenser being adapted for lower voltages the die-electric may naturally be made thinner, without there being any fear of a disruptive discharge being produced. Practically, there is a limit to very thin layers. It has been found that in the presence of such a thickness of the layer the condenser may be used at the same time as a rectifier for voltages above those entering into consideration for the condenser. For this rectifier effect it is required, however, that only one of each two electrodes separated by a single layer, is coated, for example, with an oxide layer, if both electrodes consist of the same metal viz., of a metal of the first sub-group of the fourth principal group of the periodic system.

What is claimed is:

1. An article of manufacture consisting of a pair of metallic electrodes, a dielectric layer disposed between said electrodes and in surface contact with both said electrodes, at least one of the electrodes consisting of a metal of the group including zirconium, titanium, thorium and hafnium, and said dielectric layer consisting of a stable chemical compound of a group comprising the phosphate and oxide of said one electrode.

2. An article of manufacture consisting of a pair of dissimilar metallic electrodes, a dielectric layer disposed between said electrodes and in surface contact with both said electrodes, at least one of the electrodes consisting of a metal of the group including zirconium, titanium, thorium and hafnium, and said dielectric layer consisting of a stable chemical compound of a group comprising the phosphate and oxide of said one electrode.

3. A dry condenser consisting of a pair of dissimilar metallic electrodes, a dielectric layer disposed between said electrodes and in surface contact with both said electrodes, at least one of the electrodes consisting of a metal of the group including zirconium, titanium, thorium and hafnium, and said dielectric layer consisting of a stable chemical compound of a group comprising the phosphate and oxide of said one electrode.

4. An article of manufacture consisting of a pair of metallic electrodes, a dielectric layer disposed between said electrodes and in surface contact with both said electrodes, at least one of the electrodes consisting of a metal of the group including zirconium, titanium, thorium and hafnium, and said dielectric layer consisting of a stable chemical compound of a group comprising the phosphate and oxide of said one electrode, and said remaining electrode consisting of copper.

5. An article of manufacture consisting of a pair of metallic electrodes, a dielectric layer disposed between said electrodes and in surface contact with both said electrodes, at least one of the electrodes consisting of a metal of the group including zirconium, titanium, thorium and hafnium, and said dielectric layer consisting of a stable chemical compound of a group comprising the phosphate and oxide of said one electrode, and said remaining electrode consisting of the same metal as said one electrode.

JAN HENDRIK DE BOER.
WILLEM CHRISTIAAN VAN GEEL.